April 29, 1969  H. L. KELLEY  3,440,753
FISH BITE SIGNALLING DEVICE
Filed Aug. 28, 1967
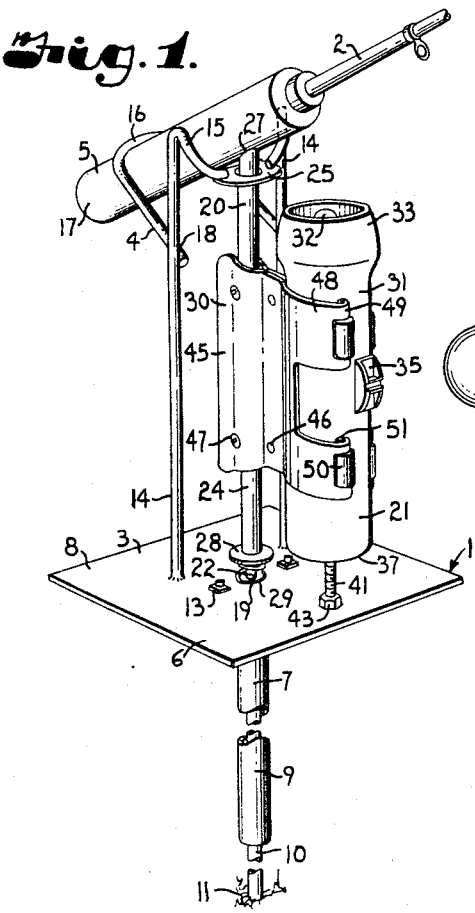
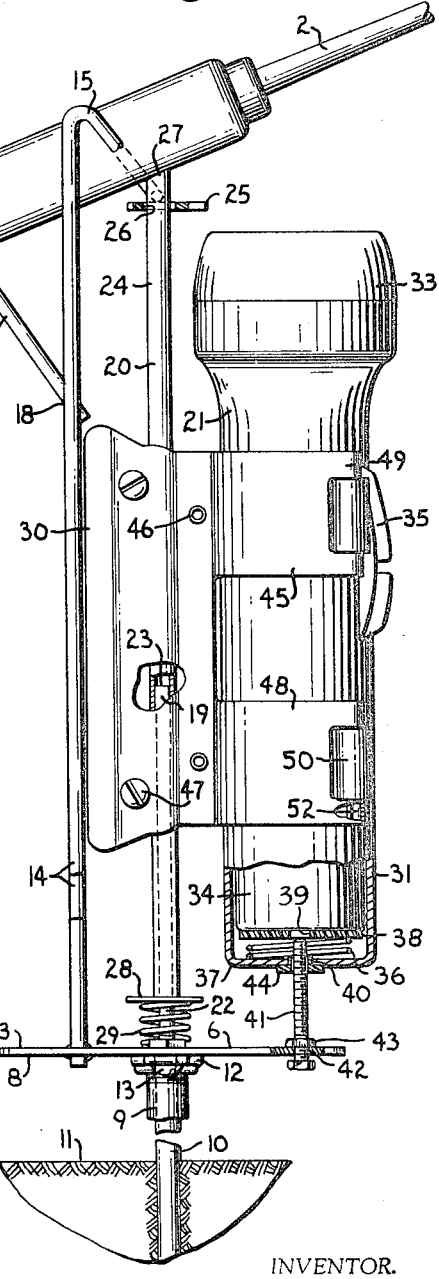
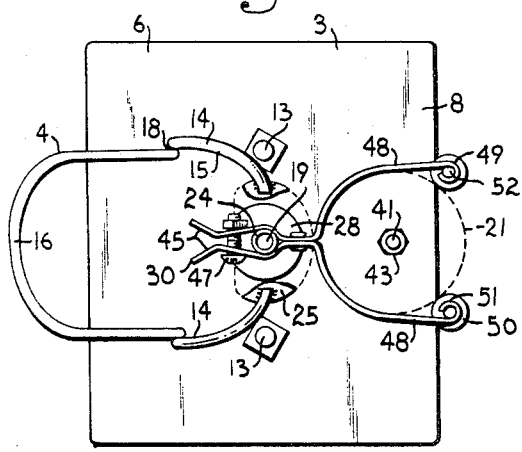
INVENTOR.
HARRY L. KELLEY
BY
Fishburn, Gold & Litman
ATTORNEYS United States Patent Office 3,440,753
Patented Apr. 29, 1969

3,440,753
FISH BITE SIGNALLING DEVICE
Harry L. Kelley, 723 Pacific, Kansas City, Kans. 66101
Filed Aug. 28, 1967, Ser. No. 663,780
Int. Cl. A01k 93/00, 97/12
U.S. Cl. 43—17                       9 Claims

ABSTRACT OF THE DISCLOSURE

A fish bite signalling device particularly for night fishing and having a signal light or means retained in a preselected position and movable therefrom in response to pull on a line to provide energization of a signal circuit to provide a signal of the fish bite. The device includes a fishing rod holder adapted to support the fishing rod butt in a preselected position so that a pull or jerk on a line attached to the fishing rod moves a battery of the circuit into contact with a contact member thereby completing a circuit and producing a visual signal.

---

The principal objects of the present invention are: to provide a fish bite signalling device responsive to a deflection or movement of a fishing rod due to a pull by a fish bite on a line attached to a fishing rod; to provide a bite signalling device particularly adapted for use in night fishing; to provide a fish bite signalling apparatus with pivoted support to turn to the direction of pulling force on a fish line; to provide a resiliently supported member having a signal device with a flashlight battery movable to effect an electrical circuit with a contact member thereby energizing a visible signal in response to movement of the resiliently supported member; to provide a fishing rod holder adapted to support the fishing rod with the resiliently supported member in engagement therewith whereby a bite moves the flashlight battery into engagement with the contact member to complete a circuit to a signal device; to provide a ground engaging support means adapted to support the bite signalling device in various type soils adjacent bodies of water such as rivers, streams, lakes, and the like; and to provide such a device of simple and sturdy construction, easy adjustment, inexpensive manufacture, and reliable in operation.

Other objects and advantages of this invention will become apparent from the following description taken in connection with the accompanying drawings wherein are set forth by way of illustration and example certain embodiments of this invention.

FIG. 1 is a perspective view of a fish bite signalling device embodying the features of the present invention.

FIG. 2 is a side elevational view of the fish bite signalling device with portions broken away to show operating parts.

FIG. 3 is a plan view of portions of the fish bite signalling device.

Referring more in detail to the drawings:

The reference numeral 1 generally designates a fish bite signalling device suitable for installation adjacent a body of water such as a stream, river, lake, and the like. The device 1 retains a fishing rod 2 in a position relative to a signal activating structure 3 so that a bite by a fish on a line pulls the rod moving same to activate a signal as later described.

The signalling device 1 includes a saddle structure 4 in which a fishing rod handle 5 rests, said saddle being on a support 6 that has a portion 7 for mounting on the ground. It is preferable that the support swing or pivot so the rod may turn to the direction from which the fish pull is extended. In the structure shown the support has a platform 8 with a depending tubular sleeve 9 fixed thereon. The sleeve extends over and is rotatable on a rod 10 adapted to be inserted into the ground as at 11. The sleeve 9 or other depending structure may be inserted in the ground or the like if desired or a rod may be mounted on the platform and a tube inserted in the ground with the rod therein to provide the pivotal mounting. The tubular sleeve 9 is shown as separable from the platform 8, said sleeve being threaded into a flanged bushing 12 secured to the platform 8 by fastening devices 13 such as bolts.

The height of the device 1 is preferably determined by the distance that the spike rod 10 remains above the ground surface and suitable stops provide the engagement to support the platform thereon. In the structure illustrated the upper or free end of the rod 10 engages the bottom of the platform 8.

The fishing rod holder or saddle 4 is mounted on the platform 8 and is constructed to retain the handle 5 of the fishing rod 2 in a selected position. The saddle portion 4 is on suitable upstanding columns 14 on the platform. In the structure illustrated, the columns are a pair of laterally spaced rods having lower ends fixed to the platform. The upper portions have return portions 15 generally curved to conform to the shape of a portion of the handle 5. The rod is held by a retainer 16 which engages over the handle 5 rearwardly of the saddle and adjacent the butt end 17 of said handle. The retainer is a rod formed in a U-shape with opposite ends welded to the respective support rods 14 at an angle in the nature of thirty degrees (30°) with the support rods 14 as indicated at 18.

The signal structure 3 includes a stationary portion 19 and a movable or trigger portion or structure 20 with the relative movement responsive to pull on a fish line. This movement activates the signal which is preferably electrical such as a battery energized light. In the structure illustrated a structure 21 such as a modified flashlight is used and the circuit is completed by said relative movement. While the flashlight structure 21 may be stationary and the circuit making member movable it is preferred to mount the structure 21 on the movable portion. An upright guide member 22 in the form of a post or rod is fixed on the platform with the upper end 23 spaced substantially below the fishing rod holder, but with said guide of such length to suitably retain the movement of a sleeve 24 slidable thereon in a linear path.

The flashlight structure 21 is carried on the sleeve 24 and said sleeve 24 is slidable on the guide rod. The sleeve is biased upwardly whereby the upper end of said sleeve 24 engages the fishing rod handle 5 forwardly of the portion of saddle 4 engaged with said handle. To aid in guiding the sleeve 24, a guide bushing 25 is fixed to the return portions 15 of the saddle and has a bore 26 through which the sleeve 24 is slidable. The upper end of the sleeve is leveled or inclined as at 27 to the angle of the portion of the handle 5 engaged thereby. The lower end of the sleeve 24 has an abutment member or flange 28 and a spring 29 sleeved on the guide member 22. The spring 29 has ends engaging said flange 28 and the platform 8 to provide an upward force on the handle and permit necessary downward movement in response to a fish bite to activate the signal.

The flashlight structure 21 is suitably mounted on the movable member or sleeve 24 and is adjustable on the length thereof by means of a suitable clamp holder 30.

The flashlight 21 has a casing 31 having a bulb 32 mounted in one end 33 thereof and one or more batteries 34 in the barrel of the casing 31. The flashlight 21 has the usual switch 35 normally in an on circuit-making position and the batteries 34 are urged into contact with the bulb by a spring 36 between the casing end 37 and the rearmost battery. In ordinary flashlights the spring forms an electrical contact between the battery and casing, but in the modified flashlight this connection is prevented by an insulation disk 38 that separates the spring and battery. The disk 38 has a central aperture 39 for a circuit making member or portion on the stationary part. The casing end 37 has a bore 40 aligned with the aperture 39 and is of a size to permit an elongate contact member 41 to freely extend therethrough. The contact member 41 is adjustably mounted on the platform 8 and in the illustrated structure the contact member 41 is a bolt threaded through a bore 42 in the platform 8 and is held in place by a suitable lock nut 43 engaging the platform 8.

It is preferred that a bushing 44 of suitable material be positioned in the casing bore 40 to provide a free movement of the contact member 41 and to guide the flashlight 21 in its movement toward the contact member 41. The bushing 44, the bore in the insulating member 38, and the casing bore 40 are axially aligned to receive the contact member 41 therein.

The flashlight 21 is held in a selected position by the clamp holder 30 which as shown includes a pair of clamping plates 45 mounted on the tubular member or sleeve 24 and movable therewith. The clamping plates 45 are suitably secured together as by rivets 46 and formed to engage and be clamped onto the sleeve 24 by fastening devices such as bolts 47 extend through the clamping plates 45 adjacent the sleeve 24 but on the opposite side from the rivets 46. Each of the clamping plates 45 has a pair of extensions 48 from adjacent the rivets 46, which extensions 48 are curved to a shape substantially conforming to the flashlight casing 31. Each of the extensions 48 terminate in bifurcated ends 49 supporting a roller 50 therebetween. The bifurcated ends 49 are curved or rounded toward casing 31 to form respective loops 51 in which are supported pin 52 extending therethrough which rotatably support the rollers 50. It is perferable that the rollers 50 be of a resilient material such as rubber or plastic to permit the casing 31 to be easily inserted between and removed from the clamp holder 30.

Any suitable signalling means such as a horn or bell could be substituted for the flashlight 21 however, since the necessity for signalling is associated with night fishing when the fishing pole or rod 2 may not be visible to the fisherman, it is preferable to employ a visual signal to also indicate the particular fishing rod 2 of a battery of similar rods which has the bite.

In operation, the rod 10 is inserted substantially vertically into the ground and then the fishing rod handle 5 is positioned in the saddle with the butt end under the retainer 16, the handle resting on the upper end of the sleeve 24. The flashlight 21 is moved to a preselected position where the battery 34 has a predetermined spacing from the contact member 41 depending upon the amount of pull on the fishing rod 2 necessary to move the battery 34 into engagement with the contact or activation member 41. The type of water current, that is, still or swift, also determines the positioning of the flashlight 21. The switch 35 is moved to the "on" position and the bite signalling device 1 is thereby prepared to display a visual signal upon a fish getting on the line (not shown). In the even the fish gets off the line the fishing rod 2 and the flashlight 21 would be urged by the spring 29 to return to the prior position thereby interrupting the signal circuit formed by the contact member 41, the battery 34, the switch 35, and the bulb 32.

It is to be understood that while certain forms of this invention have been illustrated and described, it is not to be limited to the specific form or arrangement of parts herein described and shown.

What I claim and desire to secure by Letters Patent is:

1. A bite signalling device comprising:
 (a) a support means;
 (b) a fishing rod holder mounted on said support means, a fishing rod supported by the fishing rod holder;
 (c) signalling means having a casing, a bulb in one end of the casing, a battery mounted within the casing and engaging said bulb, a casing bore in an opposite end of the casing, and an insulating member separating the opposite end of the casing and one end of the battery, said insulating member having a bore coaxially aligned with said casing bore;
 (d) a movable elongate member mounted on said support means and having means to engage said signalling means and having an end engaging a butt end of said fishing rod, said elongate member and signalling means being movable as a unit;
 (e) resilient means mounted on said support means and urging said movable elongate member into a relaxed position against the fishing rod from which the fishing rod and elongate member move in response to the pull of a fish bite against the bias of the resilient means;
 (f) an elongate contact member carried by said support means, and having one end thereof extending through said casing bore and spaced from one end of said battery for circuit making engagement therewith when the signalling means and support therefor are moved in response to a fish bite.

2. The bite signalling device as set forth in claim 1 wherein said elongate member supporting said signalling means includes:
 (a) an elongate guide rod fixed on said support means and extending toward the fishing rod holder,
 (b) an elongate tubular member having one end portion axially and movably mounted on said elongate guide rod;
 (c) clamping means mounted on said tubular member and retaining said signalling means thereon and
 (d) an abutment member engaging said tubular member and said resilient means.

3. The fish bite signalling device as set forth in claim 1 wherein said fishing rod holder includes:
 (a) a fishing rod support member extending from said support means;
 (b) retaining means mounted on said support means, said retaining means being adapted to engage a butt end of said fishing rod and retain same therein; and
 (c) saddle means mounted on said support member, said saddle means being adapted to receive a portion of the fishing rod forwardly of said butt end; and
 (d) means on said saddle for guiding said elongate tubular member.

4. The bite signalling device as set forth in claim 2 wherein said fishing rod holder includes:
 (a) a pair of support rods extending from said support means,
 (b) a retaining rod having opposite ends mounted on respective support rods, said retaining rod being mounted at an angle with said support rods and having a return portion connecting said opposite ends, said return portion being adapted to engage the butt end of said fishing rod and retain same; and
 (c) a guide connected to said support rods, said guide being adapted to guide said opposite end of said elongate tubular member.

5. The fish bite signalling device as set forth in claim 4 wherein said fish device is rotatably mounted on said support means, said rotatable mounting including:
 (a) a ground penetrating member, said member being adapted to be inserted into said ground with a free end extending thereabove,
 (b) a sleeve extending over said free end and said support means comprising a platform secured on one end of said sleeve.

6. A fish bite signalling device comprising:
 (a) a support means, (b) a fishing rod holder mounted on said support means, said holder retaining a butt end of a fishing rod therein;
(c) a resiliently mounted trigger structure, said trigger structure including an elongate guide rod mounted on said support means and an elongate tubular member slidably mounted on said guide rod with one end thereof engaging said butt end of said fishing rod and being movable between a normally relaxed position and an activation position;
(d) an activation member mounted on said support means, and
(e) signalling means mounted adjacent to said elongate tubular member so as to be movable therewith, said signalling means being activated by contact with said activation member as said elongate tubular member is moved to said activation position in response to a fish bite.

7. The fish bite signalling device as set forth in claim 6 wherein said signalling means includes:
(a) a casing;
(b) a bulb in one end of the casing;
(c) a battery mounted in the casing and having one end engaging the bulb;
(d) a casing bore in an opposite end of the casing, and
(e) an insulating member separating the opposite end of the casing and an opposite end of the battery, said insulating member having a bore axially aligned with said casing bore
(f) said activation member having one end extending through said casing bore and spaced from one end of said battery for circuit making engagement therewith when the signalling means and support therefor are moved in response to a fish bite.

8. The fish bite signalling device as set forth in claim 7 wherein said device is rotatably mounted on said support means, said rotatable mounting comprising:
(a) a ground penetrating member adapted to be inserted into the ground with a free end extending thereabove, and
(b) a sleeve extending over said free and said support means comprising a platform secured on one end of said sleeve.

9. The fish bite signalling device as set forth in claim 8 wherein said fishing rod holder comprises:
(a) a fishing rod support mmeber extending from said platform,
(b) retaining means mounted on said support member, said retaining means being adapted to engage a butt end of said fishing rod and retain same therein, and
(c) saddle means mounted on said support member, said saddle means being adapted to receive a portion of said fishing rod forwardly of said butt end, and
(d) guide means on said saddle for guiding said elongate tubular member.

References Cited

UNITED STATES PATENTS

| | | | |
|---|---|---|---|
| 2,631,400 | 3/1953 | Nagle | 43—17 |
| 2,817,176 | 12/1957 | Harshbarger | 43—17 |
| 3,020,664 | 2/1962 | Snyder et al. | 43—17 |

ALDRICH F. MEDBERY, *Primary Examiner.*

DANIEL J. LEACH, *Assistant Examiner.*